United States Patent Office 3,249,250
Patented May 3, 1966

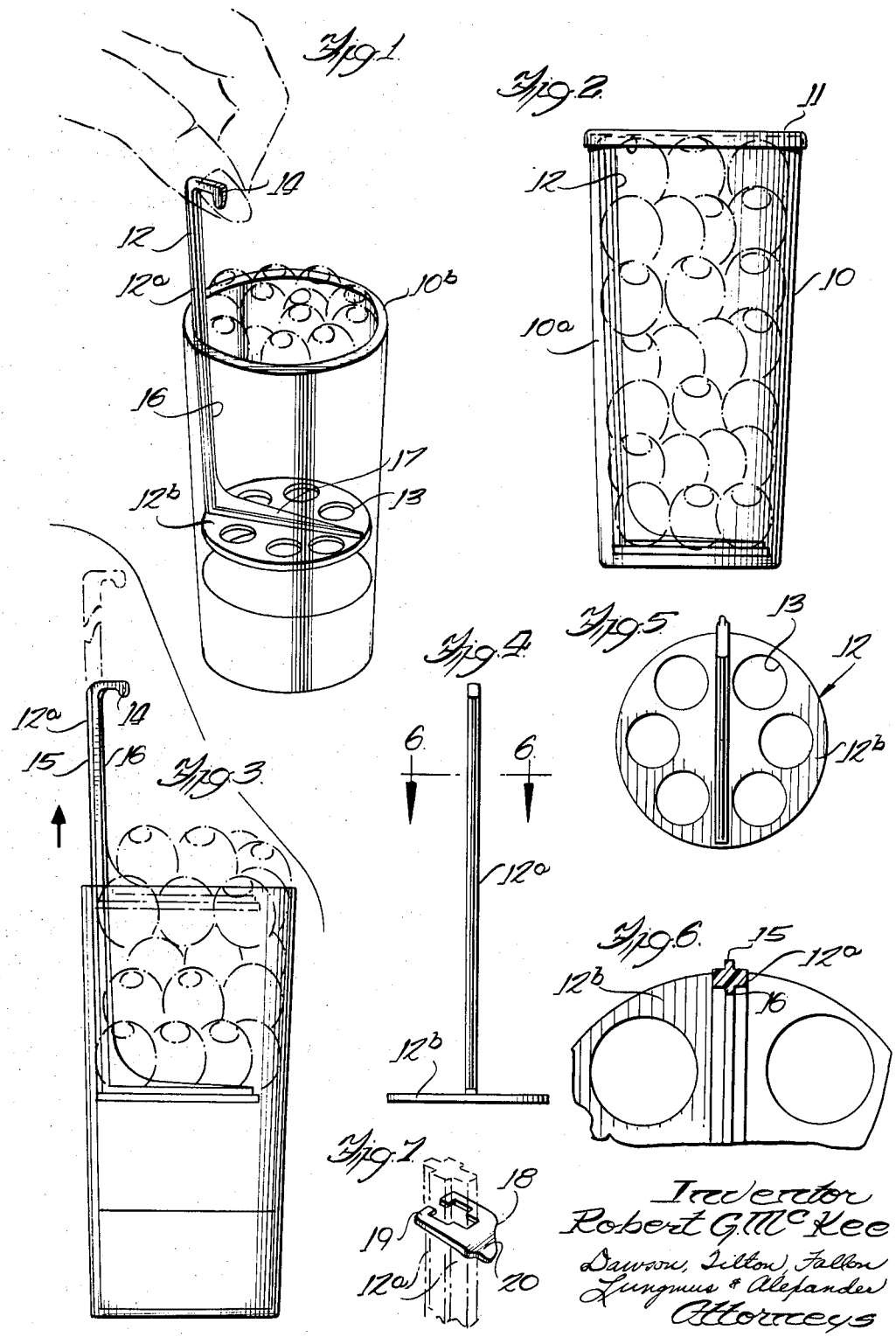

3,249,250
OLIVE DISPENSING DEVICE
Robert G. McKee, 30 W. Chicago St., Chicago, Ill.
Filed Aug. 4, 1964, Ser. No. 387,311
1 Claim. (Cl. 215—100)

This invention relates to a device for dispensing or removing discrete food items or objects from the containers in which such items are packaged. The invention is of particular utility with respect to the dispensing of olives from the wide-mouth jars in which such olives are commonly packaged for sale by the retailer and storage by the consumer.

As it is well known, olives are commonly marketed in wide-mouth glass jars. Despite the large-mouth construction of such pars and the transparent character of the jars' walls, removal of the olives in the lower portion of such jars often presents a problem for consumers. The top layers of olives are easily removed using fingers, but thereafter a fork or some other instrument is normally required to spear or grip the olives to be removed from the jar's lower portion. Since olives are generally packed in liquid, they tend to shift about when poked and, under such circumstances, it is frequently quite difficult to spear a smooth-surfaced olive with a fork or other device.

In an effort to reduce such problems, packers have in recent years made use of a plastic olive "trees" which greatly facilitate the extraction of olives from their jars. The "tree" consists essentially of a plastic stem which extends axially within the jar and which has radially-extending branches on which the olives are impaled. To extract the olives from the jar, a user simply lifts the tree with one hand and picks the olives off the plastic branches with the other.

An important disadvantage of such plastic "trees" lies in the fact that in the packaging operation the olives must be individually placed upon the branches and the substantial costs involved in such an operation must necessarily be passed on to the consumer. Accessibility is therefore achieved only at the expense of economy. Furthermore, even aside from cost considerations, the "tree" is not a complete solution to the problem since both of a user's hands are required to extract olives from the jar, not only the olives impaled on the lower branches, but the olives at the top of the jar as well.

Accordingly, it is a principal object of the present invention to provide a device which overcomes the problems described above and, specifically, a device which has all of the advantages of the olive "tree" without the aforementioned shortcomings thereof. It is an object of the invention to provide an olive lifting device which permits low-cost packaging of the jars in a conventional manner, without the need for placing individual olives on the branches of a plastic "tree". It is a further object to provide a device which permits a user to extract olives from a jar with the use of only one hand. In short, it is a main object of the invention to provide a device which is easier to use than an olive "tree" and which is far more economical for both the packager and the consumer.

Other objects will appear from the specification and drawings in which:

FIGURE 1 is a perspective view of a jar equipped with the olive-lifting device of the present invention;

FIGURE 2 is a side elevational view of a sealed jar containing olives and the lifting device;

FIGURE 3 is an elevational view similar to FIGURE 2 but showing the lifting device in partially raised (solid lines) and fully raised (broken lines) positions;

FIGURE 4 is a front elevational view of the lifting device;

FIGURE 5 is a top plan view of the device;

FIGURE 6 is an enlarged horizontal sectional view taken along line 6—6 of FIGURE 4;

FIGURE 7 is a perspective view of a locking collar for holding the device at a selected elevation.

Referring to the drawings, FIGURE 2 illustrates a standard wide-mouth glass jar 10 of the type commonly used for packaging olives and other food items. The side walls 10a of the jar slope gradually upwardly and outwardly so that the jar's maximum diameter is at its mouth 10b. A closure 11 in the form of a metal or plastic cap fits tightly about the open top of the jar and normally maintains the contents in sealed condition therein.

Since the taper of the jar is slight, and since such jars are normally circular in horizontal section, jar 10 will be referred to herein as being of generally cylindrical shape. For reasons which will become more apparent as the specification proceeds, a slight taper in a downward direction is not only tolerable but is desirable; however, an upward taper is undesirable to the extent that it will tend to result in a squeezing action on the olives and might conceivably interfere with operation of the lifting device.

The lifting device 12 is formed integrally of plastic material. Polystyrene has been found particularly effective but other plastics such as polypropylene or polyethylene might be used.

In the illustration given, the device comprises a stem 12a and an integral disk-shaped platform 12b at the stem's lower end. The disk is perforate, being provided with apertures 13 therein, and its diameter is substantially the same, or slightly less, than the inside diameter of the jar at the lower end thereof. In any event, the size of the disk must be such that a maximum distance between its edge and the inside wall surface of the jar, regardless of the elevation of the disk in the jar, must be no greater than the minimum diameter of the olives or other food items packaged in the jar. Similarly, the openings 13 must be of a size smaller than the olives to be supported thereby.

Disk 12b extends horizontally and stem 12a is substantially vertical. Where the side walls of the jar slope slightly outwardly in an upward direction, stem 12a may also be made to angle slightly outwardly in a direction conforming with the slope of the jar's side walls. The stem merges with the disk immediately adjacent the peripheral edge of the disk, and therefore, it is also disposed immediately adjacent the inside wall surface of the jar regardless of whether the lifting device is in its lowered (FIGURE 2) or raised (FIGURE 3) positions. At its upper end, the stem is provided with suitable integral gripping means which, in the illustration given, is in the form of an inwardly directed hook portion 14. As shown in FIGURE 1, the hook portion may be easily grasped between the fingers for the purpose of lifting the device and the olives supported thereby.

Referring to FIGURE 6, it will be observed that the stem is of non-circular cross section, being provided with an outwardly-directed longitudinally-extending rib 15 which extends the full length of the stem. Along the inwardly facing surface of the stem is an integral rib 16 which also extends from hook portion 14 all the way to disk 12b. In FIGURE 1 it will be seen that the disk is provided with an integral diametrically extending rib 17 which merges with rib 16 and which thereby combines with rib 16 to reinforce the juncture of the stem and disk.

In the use of the device, a user simply opens the jar and removes the olives packed in the upper portion thereof in the same manner as such olives might be removed from any jar. Since the olives near the jar's mouth are exposed and are readily accessible, they may be removed most easily by use of the fingers or by some utensil such as a spoon or fork.

It is only after the olives in the upper portion of the jar have been removed that use of the lifting device becomes desirable and, by that time, handle or hook portion 14 is fully exposed and may be easily grasped between the fingers. The device is simply lifted by exerting an upward force on handle portion 14 so as to bring the olives from the lower portion of the jar up to the mouth thereof. It has been found that normally the lifter need not be used until after the olives in the top layers have been removed by conventional means. As the olives are lifted into a position in which they are easily accessible for removal from the jar, the oils and juices about the olives flow downwardly through openings 13. As a result, there is no danger that in the use of the lifting device the liquids contained within the jar will be splashed or otherwise removed therefrom.

To facilitate one-handed operation of the device, stem 12a may be equipped with a sliding lock 18 of the type shown in FIGURE 7. Preferably, lock 18 is formed of polyethylene, although other materials having similar characteristics of resiliency or flexibility might be used. As shown, the locking device 18 is generally U-shaped in configuration, having a pair of inwardly-directed spring arms 19. The opening between the arms conforms generally to the cross-sectional shape of the stem. The connecting portion of the device which bridges the spring arms 19 is provided with an enlargement 20, which, in the illustration given, is curved downwardly to engage and hook or seat upon the rim 10a of the container. The tension of spring arms 19 is sufficient to hold the locking device at any selected position along the stem despite the weight of the device 12 and the container's contents supported thereby. However, the lock 18 may be manually urged or slid along the stem to hold the device 12 and disk 12b at any desired elevation.

While in the foregoing I have disclosed an embodiment of the invention in considerable detail for purposes of illustration, it will be understood by those skilled in the art that many of these details may be varied without departing from the spirit and scope of the invention.

I claim:

A device for removing olives and other discrete objects from a wide mouth and generally cylindrical jar, comprising a generally horizontal plastic disk having an integral upstanding stem merging with said disk adjacent the periphery thereof, said disk having openings therein of a size no greater than the smallest size of the objects to be extracted from the jar, said stem being of non-circular cross section and having at its upper end a hook portion to facilitate the lifting of said device with respect to said jar, and a generally U-shaped locking member having a pair of spring arms and having an integral connecting portion joining said arms, said arms and connecting portion defining a non-circular opening conforming generally to the cross sectional configuration of said stem, said spring arms being frictionally engageable with the sides of said stem for frictionally retaining said locking member in any selected position of adjustment along the stem, and said connecting portion having an outward enlargement adapted to seat upon the rim of said jar for supporting said device in an elevated position therein, said locking member being slidable along said stem into selected positions of adjustment for holding said device at selected elevations within said container for the extraction of objects supported by said disk within said jar, said stem being provided with a longitudinal rib extending along the outer side thereof and having a length substantially equal to the length of said stem, said rib being slidable through the opening of said locking member and preventing rotation of said member with respect to said stem.

References Cited by the Examiner
UNITED STATES PATENTS

| | | | |
|---|---|---|---|
| 344,567 | 6/1886 | Coleman | 215—100 |
| 522,693 | 7/1894 | McLaughlin. | |
| 2,070,495 | 2/1937 | Strutz et al. | 215—100 |
| 2,904,205 | 9/1959 | Callery | 215—100 |

GEORGE O. RALSTON, *Primary Examiner.*

FRANKLIN T. GARRETT, *Examiner.*

V. A. TOMPSON, D. F. NORTON, *Assistant Examiners.*